United States Patent
Lu et al.

(10) Patent No.: US 8,792,423 B2
(45) Date of Patent: Jul. 29, 2014

(54) METHOD AND ARRANGEMENT FOR RRC SWITCHING

(75) Inventors: Qianxi Lu, Beijing (CN); Rui Fan, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 20 days.

(21) Appl. No.: 13/521,314

(22) PCT Filed: May 24, 2012

(86) PCT No.: PCT/EP2012/059726
§ 371 (c)(1),
(2), (4) Date: Jul. 10, 2012

(87) PCT Pub. No.: WO2013/113403
PCT Pub. Date: Aug. 8, 2013

(65) Prior Publication Data
US 2013/0194941 A1    Aug. 1, 2013

(51) Int. Cl.
*H04W 4/00* (2009.01)

(52) U.S. Cl.
USPC .......................................... 370/328; 455/450

(58) Field of Classification Search
USPC .............. 370/229–230.1, 252, 328–330, 338, 370/400, 401, 468; 455/445, 450–452.2
See application file for complete search history.

(56) References Cited

U.S. PATENT DOCUMENTS

| | | | |
|---|---|---|---|
| 2006/0052137 A1 | 3/2006 | Randall et al. | |
| 2007/0287476 A1* | 12/2007 | Jeong et al. | 455/456.6 |
| 2011/0222451 A1 | 9/2011 | Peisa et al. | |
| 2013/0088962 A1* | 4/2013 | Stjernholm et al. | 370/235 |
| 2013/0089038 A1* | 4/2013 | Hannu et al. | 370/329 |
| 2013/0194991 A1* | 8/2013 | Vannithamby et al. | 370/311 |

OTHER PUBLICATIONS

3rd Generation Partnership Project. "Evolved Universal Terrestrial Radio Access (E-UTRA); Radio Resource Control (RRC); Protocol specification." 3GPP TS 36.331 V.10.4.0, Dec. 2012.
3rd Generation Partnership Project. "Clean Up and Update on Security, Scheduling, Mobility, MBMS and DRX" 3GPP TSG-RAN2 Meeting #60, R2-075498, Jeju, South Korea, Nov. 5-9, 2007.
3rd Generation Partnership Project. "Simulation Results for Background and IM" 3GPP TSG-RAN WG2 Meeting #76, R2-115794, San Francisco, United States of America, Nov. 14-18, 2011.
3rd Generation Partnership Project. "Power Consumption and Signalling Load for Background Traffic" 3GPP TSG-RAN WG2 Meeting #76, R2-115931, San Francisco, United States of America, Nov. 14-18, 2011.
3rd Generation Partnership Project. "Signaling Considerations for Background Traffic" 3GPP TSG-RAN WG2 Meeting #76, R2-116036, San Francisco, United States of America, Nov. 14-18, 2011.

* cited by examiner

*Primary Examiner* — Kerri Rose
(74) *Attorney, Agent, or Firm* — Murphy, Bilak & Homiller, PLLC

(57) ABSTRACT

In a method of controlling RRC (Radio Resource Control) state switching in a wireless communication system, adaptively controlling (S40) RRC state switching between an idle state and a connected state for a user equipment based on at least a detected mobility measure for said user equipment.

20 Claims, 13 Drawing Sheets

METHOD AND ARRANGEMENT FOR RRC SWITCHING

TECHNICAL FIELD

The present disclosure relates to wireless communication systems in general, specifically to management of RRC (Radio Resource Control) state switching in such systems.

BACKGROUND

A fundamental feature in cellular radio communication systems is handover (HO). Handover is a main function that is used to support mobility in the network. When a mobile terminal or user equipment (UE) is moving in the cellular network, it has to change serving cell when the signal from a current cell is too weak to support the current radio link and/or when it is decided that another cell has better possibilities to support the radio communication for the user terminal.

LTE (Long Time Evolution) is a radio access technology standardized by the 3GPP (3d Generation Partnership Project). An LTE system uses orthogonal frequency division multiplex (OFDM) as a multiple access technique (called OFDMA) in the downlink from system nodes to user equipment. An LTE system typically has channel bandwidths ranging from about 1.4 MHZ to 20 MHz, and supports throughputs of more than 100 megabits per second on the largest-bandwidth channels. One type of physical channel defined for the LTE downlink is the physical downlink shared channel (PDSCH), which conveys information from higher layers in the LTE protocol stack and to which one or more specific transport channels are mapped. Control information is conveyed by a physical uplink control channel (PUCCH) and by a physical downlink control channel (PDCCH).

The LTE radio access architecture is based around LTE radio base stations, referred to as eNodeB, which communicate with mobile terminals, also referred to as User Equipment (UE).

In LTE (as well as in WCDMA) the so-called Radio Resource Control (RRC) protocol performs a plurality of functions between the user equipment and the base station e.g. eNodeB. Amongst those functions can be mentioned broadcasting system information related to NAS (Non-Access Stratum) and AS (Access Stratum), establishment, maintenance, and release of RRC connection, establishment, configuration, maintenance, and release of signaling and data radio bearers. Of these functions, the management of the RRC connection is of most interest for the current disclosure.

In LTE a user equipment (UE) can be in two different states as illustrated in FIG. 1. One state, the RRC_CONNECTED is the state used when the user equipment is active and connected to a specific cell e.g. eNodeB within the network. One or several IP addresses have been assigned to the user equipment, as well as an identity of the user equipment, the Cell Radio Network Temporary Identifier (C-RNTI), used for signaling purposes between the user equipment and the network. Although expressed differently in the specification, the RRC_CONNECTED state can be said to include two sub-states, namely IN_SYNC and OUT_OF_SYNC, depending on whether the uplink is synchronized to the network or not. Since LTE uses an orthogonal FDMA/TDMA (Frequency Division Multiple Access/Time Division Multiple Access) based uplink, it is necessary to synchronize the uplink transmission from different mobile terminals or user equipment to ensure that they arrive at the receiver at the same time. In short, the receiver measures the arrival time of the transmissions from each actively transmitting mobile terminal and sends timing-correction commands in the downlink. As long as the uplink is synchronized, uplink transmission for user data and L1/L2 (Layer 1/Layer 2) control signaling is possible. In case no uplink transmission has taken place within a given time window, timing alignment is obviously not possible and the uplink is declared to be non-synchronized. In this case, the mobile terminal needs to perform a random-access procedure to restore uplink synchronization. The state RRC_IDLE is a so-called low activity state in which the UE sleeps, i.e. is inactive, most of the time in order to reduce battery consumption. Uplink synchronization is not maintained and hence the only uplink transmission activity that may take place is random access to move from RRC-IDLE to RRC_CONNECTED. In the downlink, the UE can wake up, i.e. become active, periodically in order monitor the Paging Channel (PCH) according to what is commonly referred to as Discontinuous Reception Cycle (DRX) in order to be paged for incoming calls, as will be described in more detail below. The mobile terminal maintains its IP address(es) and other internal information in order to rapidly move to RRC_CONNECTED when necessary.

The above mentioned discontinuous reception cycle (DRX) is a functionality that enables reduced power consumption in order for the UEs to reduce their power consumption to save UE battery time. The DRX mechanism allows the UE to sleep most of the time, with the UE receiver circuitry switched off, and only periodically wake up for a brief period to monitor the paging channel. In essence, the DRX comprises a periodic repetition of an "on duration" period followed by a possible period of inactivity or sleep. The "on duration" defines periods of mandatory activity. Preferably, the UE is configured with an on duration of 2 ms per 20 ms. During the active periods the UE receives assignments or grants for new data after which an inactivity timer is started and the UE is prepared to be scheduled continuously. Other active periods are when the UE is expecting a retransmission of a downlink HARQ (Hybrid Automatic Retransmission reQuest) transmission, or HARQ feedback for an uplink HARQ transmission, or after transmitting a scheduling request. A known DRX scheme includes two levels of inactivity, namely, a long DRX for power efficient operation during periods of low activity, and a short DRX for low latency during periods of more activity. For a UE in the RRC_IDLE state a DRX pattern aligned to the basic paging schedule is applied on a group basis for a set of UEs. The DRX pattern is aligned to the paging schedule in such a way that the UE has a possibility to read the paging messages while awake rather than while in the battery saving DRX sleep mode.

The two above described RRC states of a UE can be summarized according to the following:
  RRC_CONNECTED: The UE RRC connection is maintained/controlled by the network. Handover procedure is used for mobility management, and the UE wakes up/sleeps according to the configured DRX parameters.
  RRC_IDLE: The UE RRC connection is released, so no UE related information is stored in the eNodeB side. Once there is data to send/receive to/from the UE, the RRC connection has to be re-established. Cell re-selection is used for mobility management, and the UE wakes up/sleeps according to the paging interval.

Based on the above it is evident that the different RRC states each cause different signaling load, i.e., more handover related signaling for connected UE, and more RRC re-establishment signaling for RRC idle UE. In addition, different RRC states mean different delay performance, since the reaction speed depends on the length of the DRX/Paging cycle.

The switching between the aforementioned two RRC states i.e. RRC_CONNECTED to RRC_IDLE, from idle to connected, and from connected to idle, is controlled by a network entity, typically the eNodeB.

A conventional known method of RRC state switching is to "release the UE to idle after N second UE inactivity". That is, the value of N i.e. the inactivity timer, is taken as the threshold to decide UE activity/inactivity, which is also denoted as the RRC timer in this disclosure.

In a known method of managing RRC state switching, presented in the document *R2-116036, Signaling considerations for background traffic, Qualcomm Incorporated, RAN2#76*, Nov. 14-18, 2011, a RRC switching scheme is proposed, which essentially considers the low/high UE mobility difference in some degree. Briefly, the scheme is to "release the UE if 1) N seconds inactivity and 2) one or more HO observed in this N second", which can be summarized according to the following:

UEs that have "HO in N inactive seconds" are treated as high mobility UEs, and will be released after N seconds.
UEs that have "No HO in N inactive seconds" are treated as low mobility UEs, and will be kept in connected mode.

Hence, according to the prior art document *R2-116036, Signaling considerations for background traffic, Qualcomm Incorporated, RAN2#76*, Nov. 14-18, 2011, the UEs can be grouped according to their level of mobility into two levels, i.e., high/low mobility, and use two timers accordingly, i.e., N and an infinite timer.

One problem with the above described prior art switching method is that it is a very blunt instrument, which will cause a less than optimal performance at high mobility levels.

Based on the above, there is a need for an improved RRC state switching method, which enables an optimization of usage of radio resources, whilst at the same time maintaining a high level of service for connected user equipment.

SUMMARY

The present disclosure aims to obviate some of the above-mentioned problems, and to provide methods and arrangements according to the included independent claims. Preferred embodiments are defined by the dependent claims.

In a first aspect, the present disclosure presents a method of controlling RRC (Radio Resource Control) state switching in a wireless communication system by adaptively controlling RRC state switching between an idle state and a connected state for a user equipment based on at least a detected mobility measure for the user equipment.

In a second aspect, the present disclosure presents an arrangement for controlling RRC state switching for user equipment in a wireless communication system, which arrangement includes a switch controller configured for controlling RRC state switching between an idle state and a connected state for a user equipment UE based on at least a detected mobility measure for the user equipment.

Advantages of the present disclosure include enabling mobility based adaptive control of RRC state switching in user equipment, which jointly minimizes power consumption, delay and signaling overhead for the user equipment.

BRIEF DESCRIPTION OF THE DRAWINGS

The invention, together with further objects and advantages thereof, may best be understood by referring to the following description taken together with the accompanying drawings, in which.

DETAILED DESCRIPTION

Throughout the drawings, the same reference numbers are used for similar or corresponding elements. Although mainly described in the context of a LTE system, the present disclosure is equally applicable to similar systems e.g. WCDMA (Wideband Code Division Multiple Access) systems.

Figure 1:
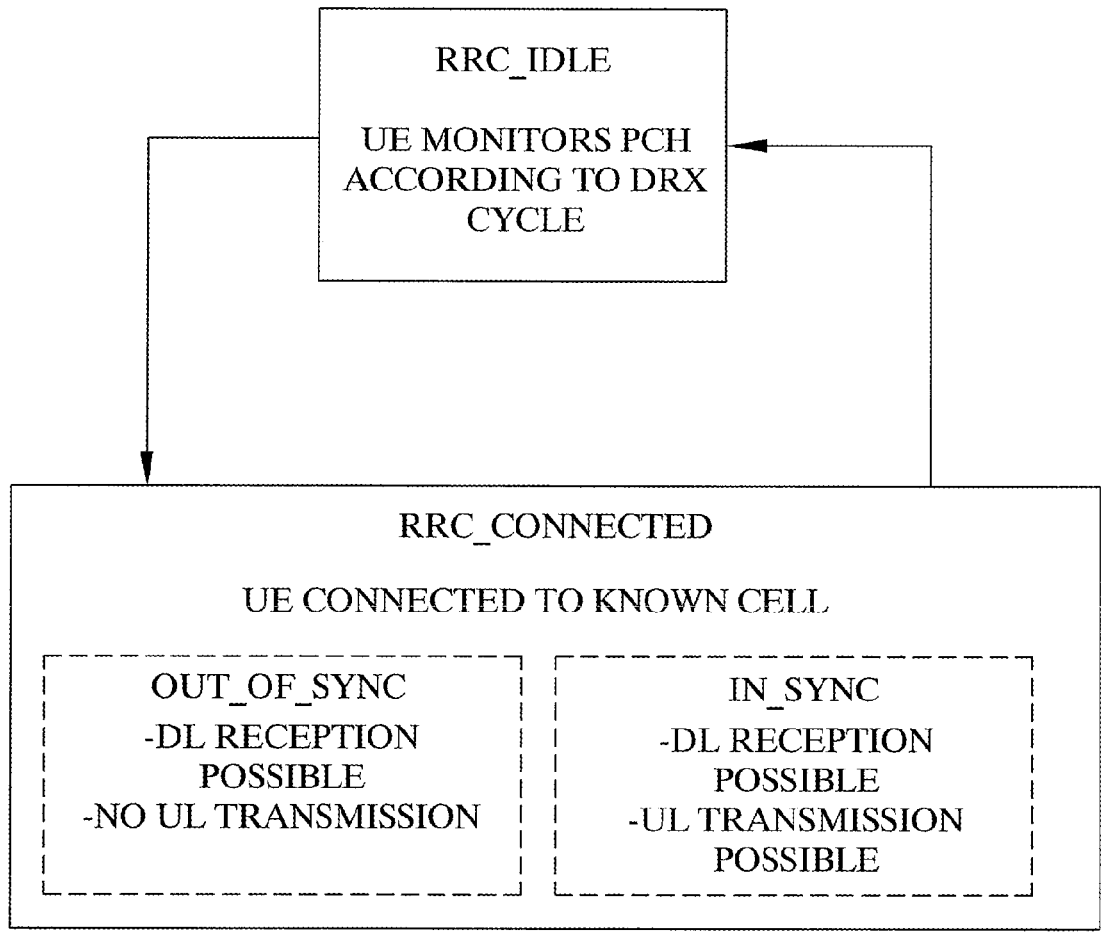
FIG. 1 is an illustration of the different RRC states of a user equipment.
Figure 2:
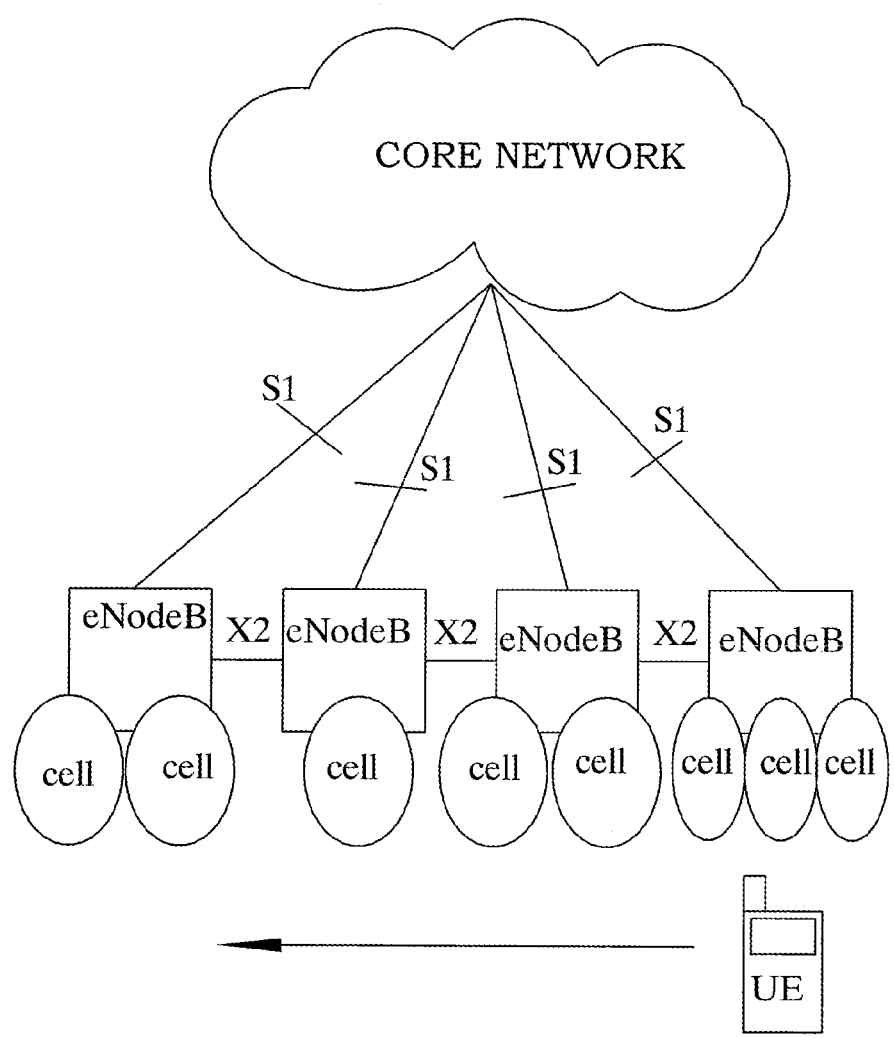
FIG. 2 is an illustration of a wireless communication system in which the present disclosure can be implemented

The simplified radio communication network illustrated in FIG. 2 includes a number of radio base stations (eNodeBs) each of which has the possibility to manage one or more radio cells, for simplicity referred to as cells. For example, one radio base station manages one or more cells such as the particular cell that currently serves a user equipment (UE). This cell is referred to as a source cell or a serving cell for that particular user equipment. Another radio base station manages one or more cells, and yet another radio base station manages one or more cells. The cells managed by those radio base stations are referred to as handover candidate cells for the UE, and the UE may be handed over to any of these cells depending on the circumstances and the radio communication conditions in particular. The radio base stations may be directly or indirectly connected to each other, depending on the radio communication system in question.

In LTE, for example, with reference to FIG. 2, the radio access network (RAN) generally has a single fundamental type of node, namely the Radio Base Station, called eNodeB. The radio access network also has an associated Operations Support System (OSS). Each eNodeB is in charge of a set of one or more cells. The cells of an eNodeB do not have to be using the same antenna site but can have separate dedicated antenna sites. The eNodeB is normally in charge of a number of functionalities, including single cell radio resource management (RRM) decisions, handover decisions, and scheduling of user equipment in both uplink and downlink in its cells. The known X2 interface connects any eNodeB in the radio communication network with any other eNodeB and is mainly used to support active-mode mobility, but may also be used for multi-cell RRM functions. Another interface, the known S1 interface, connects each eNodeB to the core network (CN).

The core network (CN) for LTE is often denoted Evolved Packet Core (EPC) to indicate that it is an evolution from the GSM/General Packet Radio Service (GPRS) core network. The EPC is developed as a single-node architecture with all its functions in one node, the Mobility Management Entity (MME), except the Home Subscriber Server (HSS) (not shown) that is a node or database containing details of each user equipment subscriber that is authorized to use the LTE core network and the user plane gateways (not shown). The EPC connects to the LTE Radio Access Network (RAN) via the-above mentioned S1 interface, to the Internet (not shown) via the known SGi interface, and to the Home Subscriber Server (HSS) (not shown) using the known S6 interface.

Based on an ongoing study of Enhancements for Diverse Data Applications' (eDDA) (*RP*-110454, *LTE RAN Enhancements for Diverse Data Applications, RAN*-51, Kansas City, USA, 15-18 Mar. 2011) within the 3GPP framework, the optimal setting of N (e.g. an inactivity timer that represents the number of seconds that the UE is idle) would be in a mobility-specific manner. It can be briefly explained as: 1) For low mobility UEs, handover (HO) happens less frequently, so a long timer should be adopted to avoid excessive RRC switching signaling, but 2) For high mobility UEs, HO happens more frequently, so a short timer should be used instead to avoid signaling burden due to its mobility. This problem obviously can not be solved by a fixed inactivity timer N for all different mobility levels.

In the present disclosure, the inventors have identified the need for performing RRC state switching for a user equipment in an adaptive manner, where the switching timer for a particular user equipment is selected based on at least a detected current mobility measure for that particular user equipment. In other words, if a UE is moving at a high speed, it will have a different optimal timer, than if it was moving at a low speed. According to a further embodiment, the optimal timer is additionally selected based on a traffic type for the user equipment. The optimal timer to select for a particular combination of mobility and traffic has preferably been determined beforehand, either by simulations or actual measurements, and can be provided in a table or other storage form, which can be maintained in a node e.g. eNodeB in the network. However, it is also possible to determine an optimal timer adaptively. Some of the considerations that need to be taken into account for the present disclosure are further described in below.

During a meeting in San Francisco (3GPP WG2#75), some interesting contributions and analyses were discussed. One of the conclusions from the discussions was that analyses have to consider the entire system not to risk sub-optimizations. Two contributions, namely *RP*-110454, *LTE RAN Enhancements for Diverse Data Applications, RAN*-51, Kansas City, USA, 15-18 Mar. 2011, and *R2*-115931, *Power consumption and signaling load for background traffic*, analyzed important aspects of RRC signaling load and battery consumption, respectively. To ensure that various aspects of different features are combined to improve system performance the different aspects should be studied simultaneously.

Figure 3:
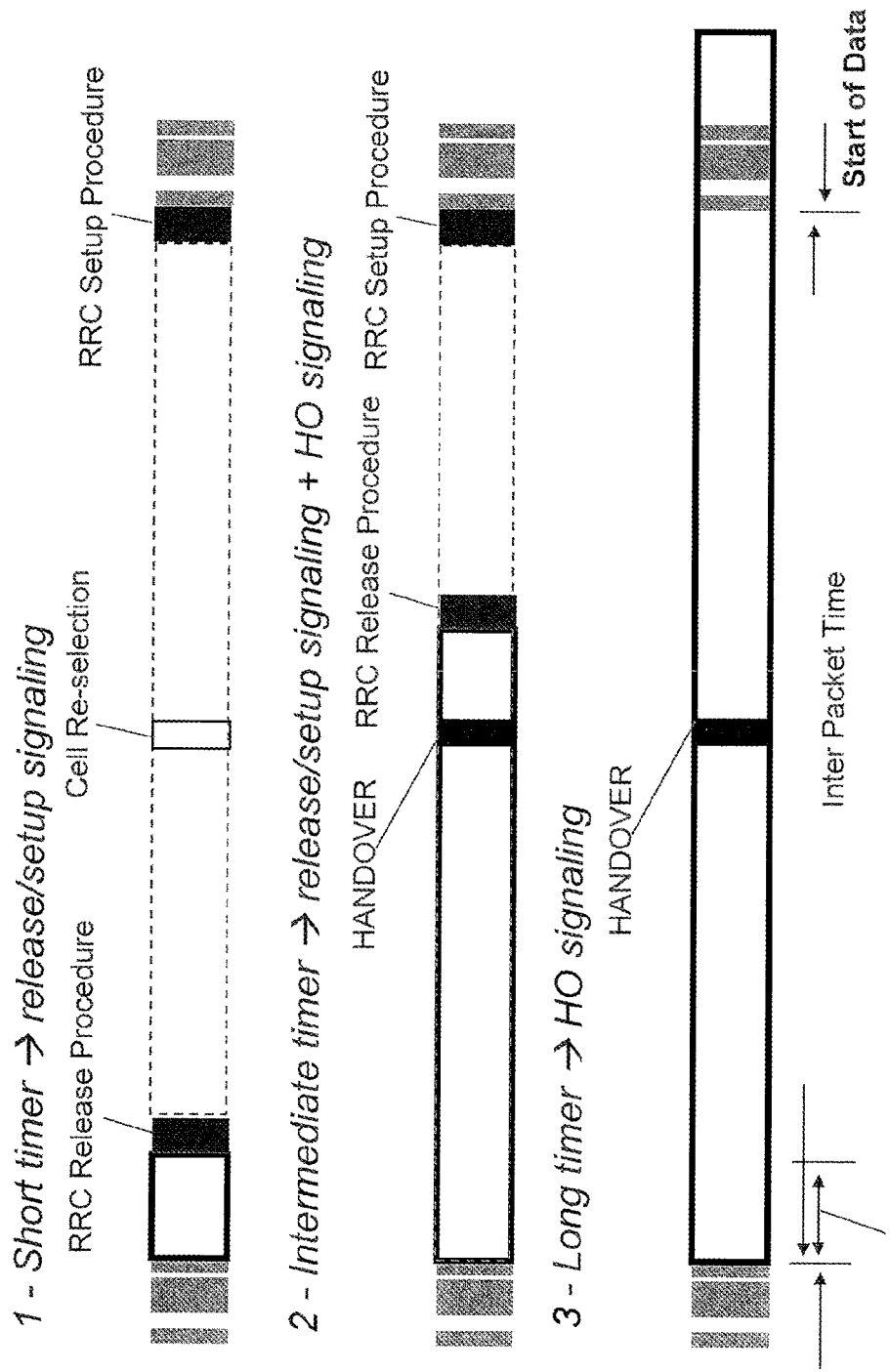
FIG. 3 illustrates examples of expected RRC signaling as an effect of RRX timer lengths.

FIG. 3 shows expected RRC signaling as an effect of different RRC timer lengths after packet transmission and buffer is empty. The top case shows how, using a very short timer, RRC connection is released almost immediately, followed by cell selection and then setup signaling again when a new packet arrives in the buffer. The other extreme is exemplified with the bottom case where, using a long timer, the connection is always on, i.e., only handover signaling is necessary.

There is also an example with intermediate RRC timer length, which may cause both RRC state switching and handover signaling, as shown in the middle case.

Figure 4:
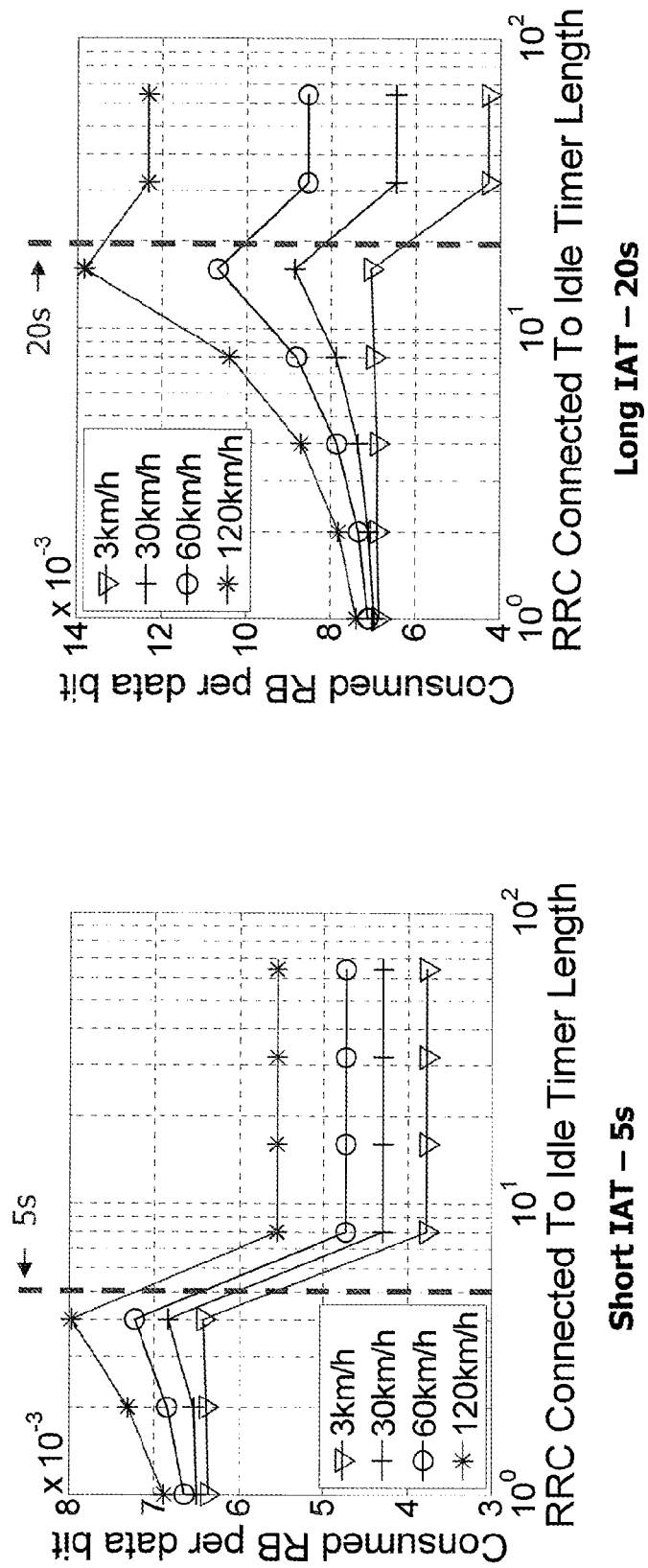
FIG. 4 illustrates the effect of different timer settings on signaling load.

With reference to FIG. 4 simulations show how varying settings of the inactivity timer N, exemplified in FIG. 3, affect the signaling load i.e. consumed RB per data bit. The simulations are run in a complete radio network simulator. To begin with using constant packet inter-arrival times to show important principles (the packet size distribution is based on instant messaging traffic) and later also a measurement-based traffic model created with statistics from instant messaging. For detailed simulator settings see Appendix 1. In the following, the metric "consumed RB per data bit" is used to show signaling load. To compare different packet inter-arrival time (IAT) scenarios, the IAT is fixed as 5 s (short) and 20 s (long). The relation between the ratios of signaling to data RLC bit as a function of the inactivity timer length is illustrated in FIG. 5.

Figure 5:
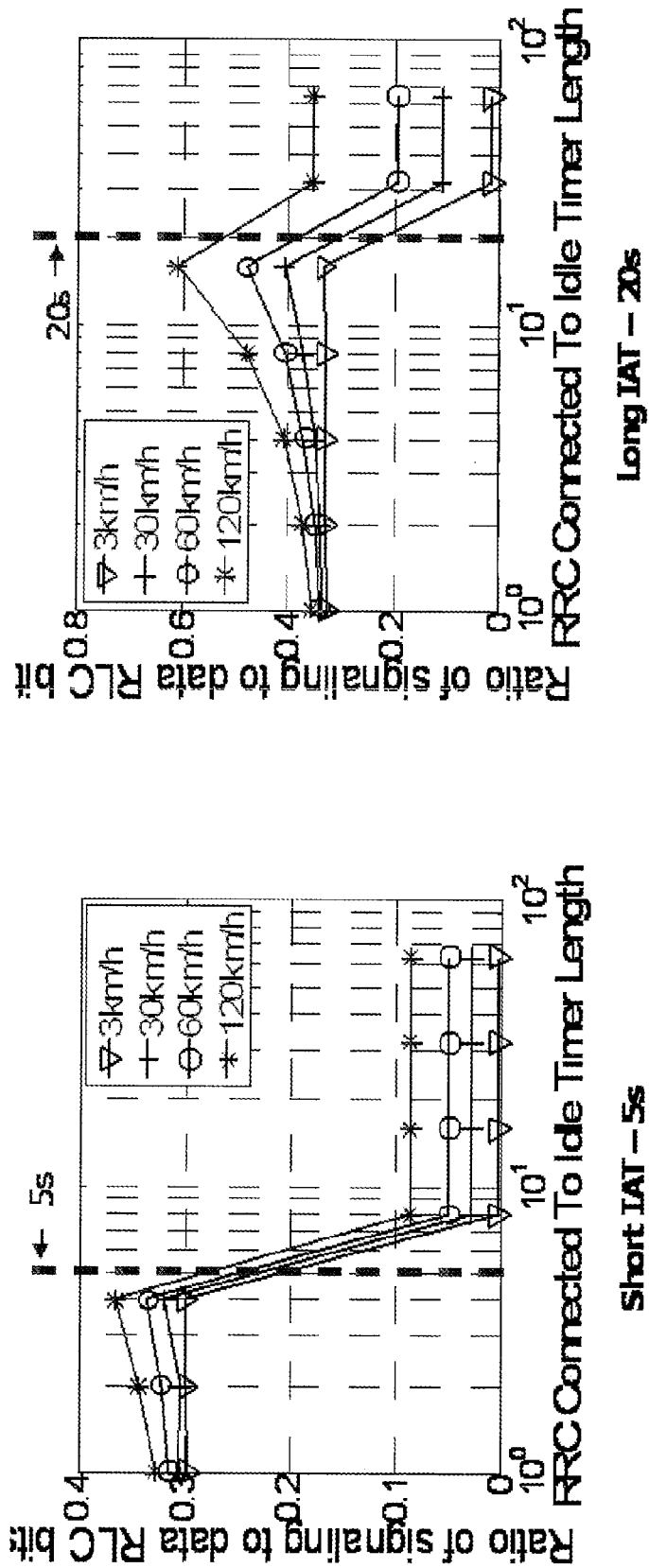
FIG. 5 illustrates comparisons of ratio of signaling to data RLC bits vs. connected to idle timer length.
Figure 6:
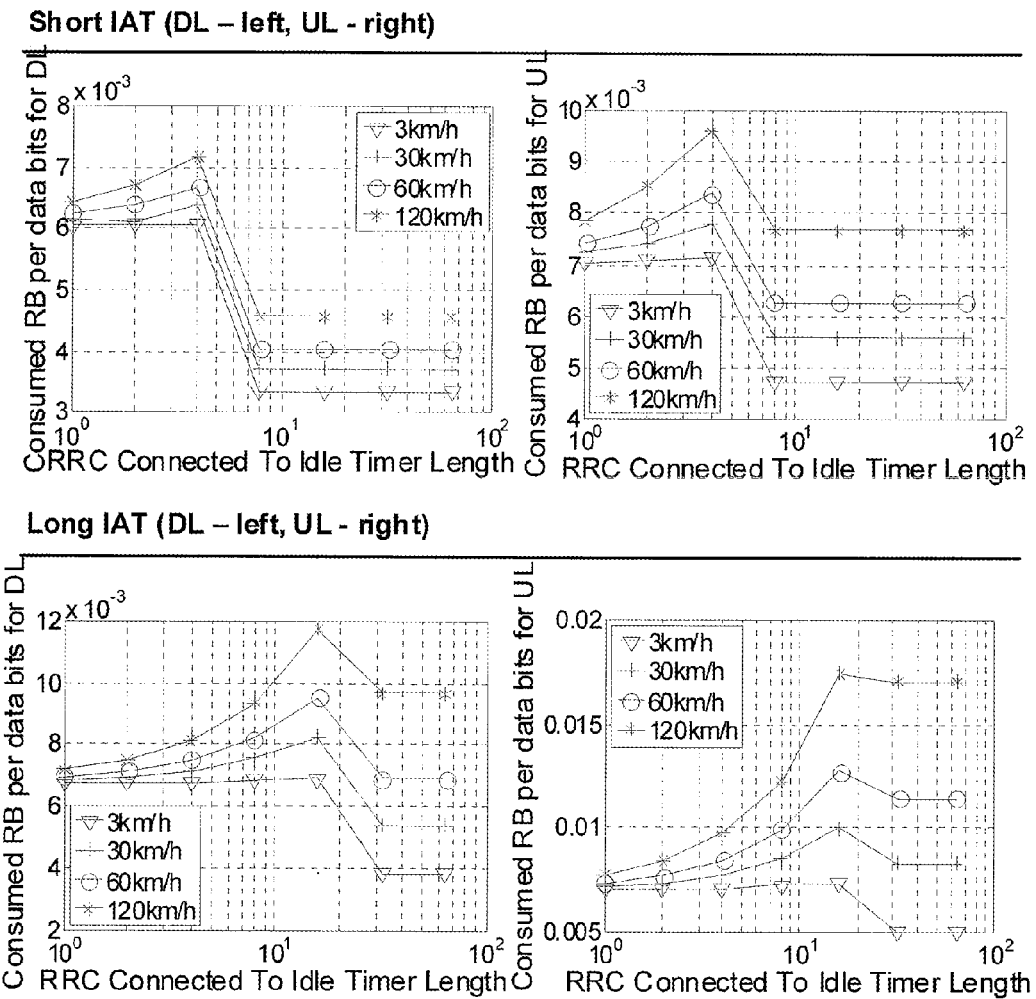
FIG. 6 illustrates comparisons of consumed RB per data bit for UL and DL vs. connected to idle timer length.

It is seen, with reference to FIG. 5-FIG. 6, that the signaling overhead first increases with the length of the timer due to more handover signaling, then decreases and eventually reaches a stable level. This behavior can be explained as when the RRC timer becomes longer than the IAT, the RRC signaling from state changes is reduced. Handovers usually create small size RLC PDUs, which consume more PRB resources than the same size of RLC bits due to RRC release/setup. As a result, e.g. the 20 s IAT scenario and the 60 km/h, although longer timer leads to less signaling RLC bits than with a shorter timer, more PRB resources are consumed. Simulations illustrating the difference between uplink UL signaling and downlink DL signaling for varying UE mobility and inactivity timer length is further illustrated in FIG. 6.

As mentioned in the background section, the RRC state switching strategy for a terminal or user equipment has a major impact on the power consumption as well as on the signaling density in the network if the mobility of the terminal e.g. user equipment is not taken into account. In the case when the network is highly loaded, the need to optimize RRC state switching strategy arises, it would be very valuable for the network to control the RRC state switching in the objective of signaling, UE power and delay minimization. This is of course especially interesting in the context of the ongoing 3GPP work on 'Enhancements for Diverse Data Applications' (eDDA), as presented in the document *RP*110454, *LTE RAN Enhancements for Diverse Data Applications, RAN*-51, Kansas City, USA, 15-18 Mar. 2011. Consequently, the inventors have identified the benefits of adopting a mobility- and optionally traffic-specific RRC timer for RRC state switching, as a balance of signaling overhead and delay QoS performance.

As mentioned previously, one of the objectives of the WI eDDA (*RP*110454, *LTE RAN Enhancements for Diverse Data Applications, RAN*-51, Kansas City, USA, 15-18 Mar. 2011) concerns "Enhancements within existing RRC states, to RRC state-control mechanisms and RRM mechanisms that offer system efficiency improvements and/or reduced UE power consumption for devices exhibiting a continued but intermittent data activity". The investigation presented above reveals a plurality of observations that provides the necessary input for the present disclosure, namely that for higher mobility frequency the RRC switching timer should be shorter to save resources. In other words, a user equipment should return to idle state quicker. Further, a UE with a low mobility i.e. moving slowly from one cell to another should remain in RRC connected state to reduce signaling load. That is, the RRC switching timer should be set to a high value. Finally, adaptively controlling the RRC timer settings based on at least mobility or mobility frequency will reduce power consumption and reduce signaling load in the cell.

Figure 7:
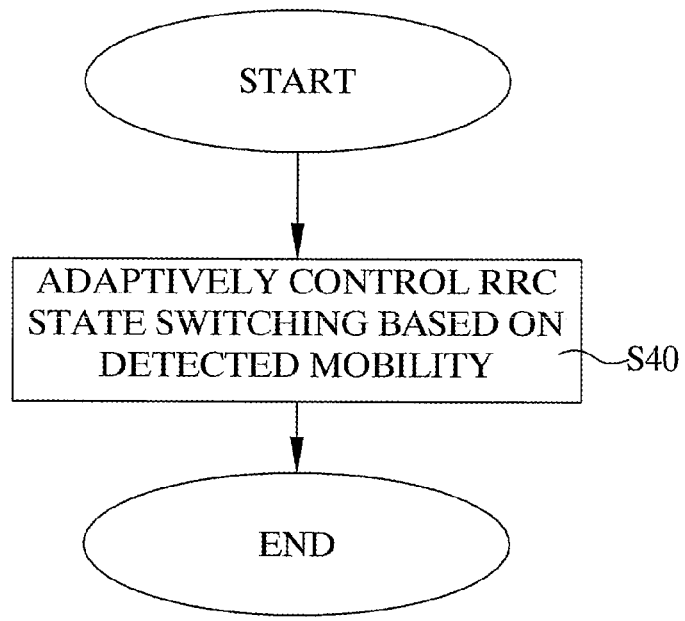
FIG. 7 is a schematic flow chart of an embodiment of a method of the present disclosure.

According to a basic embodiment, with reference to FIG. 7, the present disclosure enables controlling RRC state switching for user equipment in a wireless communication system by adaptively controlling S40 RRC state switching between an idle state and a connected state for a user equipment based on at least a detected mobility measure for the user equipment. In other words, the switching is controlled based on the current mobility e.g. velocity of the user equipment. In a further embodiment, the RRC state switching can be controlled additionally based on a detected current traffic type indicator of the user equipment. In other words, if the user equipment is experiencing a heavy load of instant messaging or VoIP or other.

Figure 8:
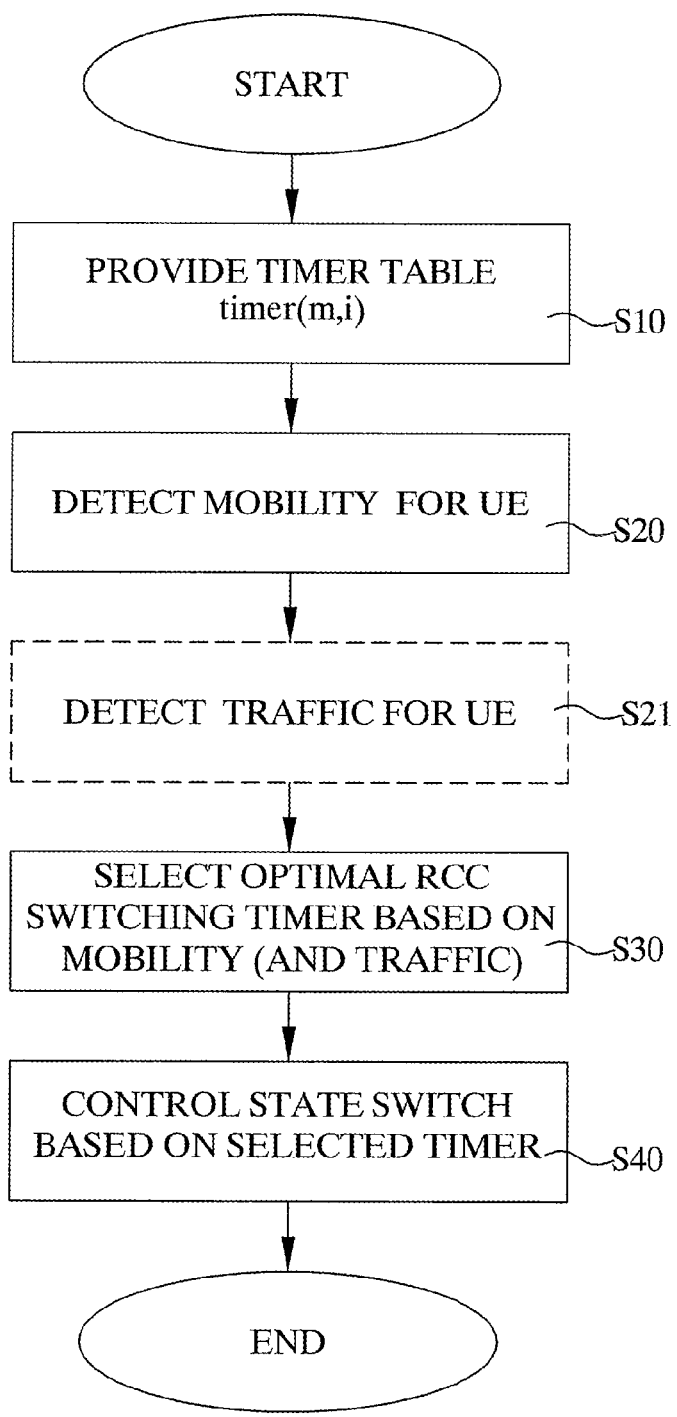
FIG. 8 is a schematic flow chart of an embodiment of a method of the present disclosure.

With reference to FIG. 8, a further embodiment of the present disclosure will be described. A network node e.g. eNodeB provides S10 and maintains a RRC switching timer table or register. The table or similar, comprises timer values as functions of mobility and optionally of traffic type. Subsequently, the node detects S20 at least a current mobility measure for a user equipment, as well as an optionally detecting S21 a traffic type indicator for the user equipment. Based on the detected mobility and the optional traffic type indicator together with the provided timer table, the node e.g. eNodeB, selects S30 an optimal timer value for the user equipment. Finally, the node controls S40 RRC state switching for the user equipment based on the selected optimal timer value. This is further summarized in an "algorithm" below.

The eNodeB maintains a pre-built table, namely timer(m,i) which is the optimal value for a specific mobility value and specific traffic type i.e. Mobility_Set (m) and Traffic_set(i). The so-called always connected strategy means an infinite long timer. Subsequently, the UE mobility M and traffic type I are detected. Finally, an RRC timer is selected based on the UE mobility and traffic. As long as a RRC timer is not selected, iterations are performed based on m,i. If the mobility M of the UE is within the Mobility_set(m) and the traffic type I is within the Traffic_set(i), a timer value in the timer table timer(m,i) is selected accordingly.

The detection S20 of the mobility measure can be performed at the UE and subsequently be reported to the eNodeB, either directly or via some other network entity. Alternatively, the mobility measure can be detected S20 by the eNodeB (or other network entity), either by itself or with support from surrounding eNodeBs via the X2 interface.

In prior art controlling RRC state switching for WCDMA was based on predicting the inter-arrival time and predicting a size of a next data burst and subsequently controlling the RRC switching based on those predictions. However, the suggested method did not result in the effectiveness required. It was proposed a traffic adaptive channel-switching algorithm, which essentially relies on the predictions of the inter-arrival time (IAT) and the predictions of the size of the next data burst, and then decides the RRC state switching based on the current predicted IAT and burst size. The problem of this prior art scheme is that the effectiveness of the scheme heavily depends on the accuracy of the prediction algorithm. However, there is not a clear traffic pattern prediction algorithm available yet.

In the current disclosure, according to a particular embodiment, the traffic is still a factor. However, instead of relying on a less than optimal traffic prediction algorithm; the current disclosure is based on a statistically optimized timer for each traffic type (for a specific mobility level). In other words, for each traffic type e.g. VoIP, messaging, internet etc, a relationship between a Quality of Service measure, such as signaling overhead, power consumption, delay etc and a RCC state switching timer is established and plotted for a plurality of mobility measures or intervals.

Although stated in the scenario of LTE system, this invention is not limited LTE system, it could be equally implemented in similar systems utilizing the RRC protocol such as WCDMA.

Further details and embodiments of the various method steps will be described below.

Figure 9:
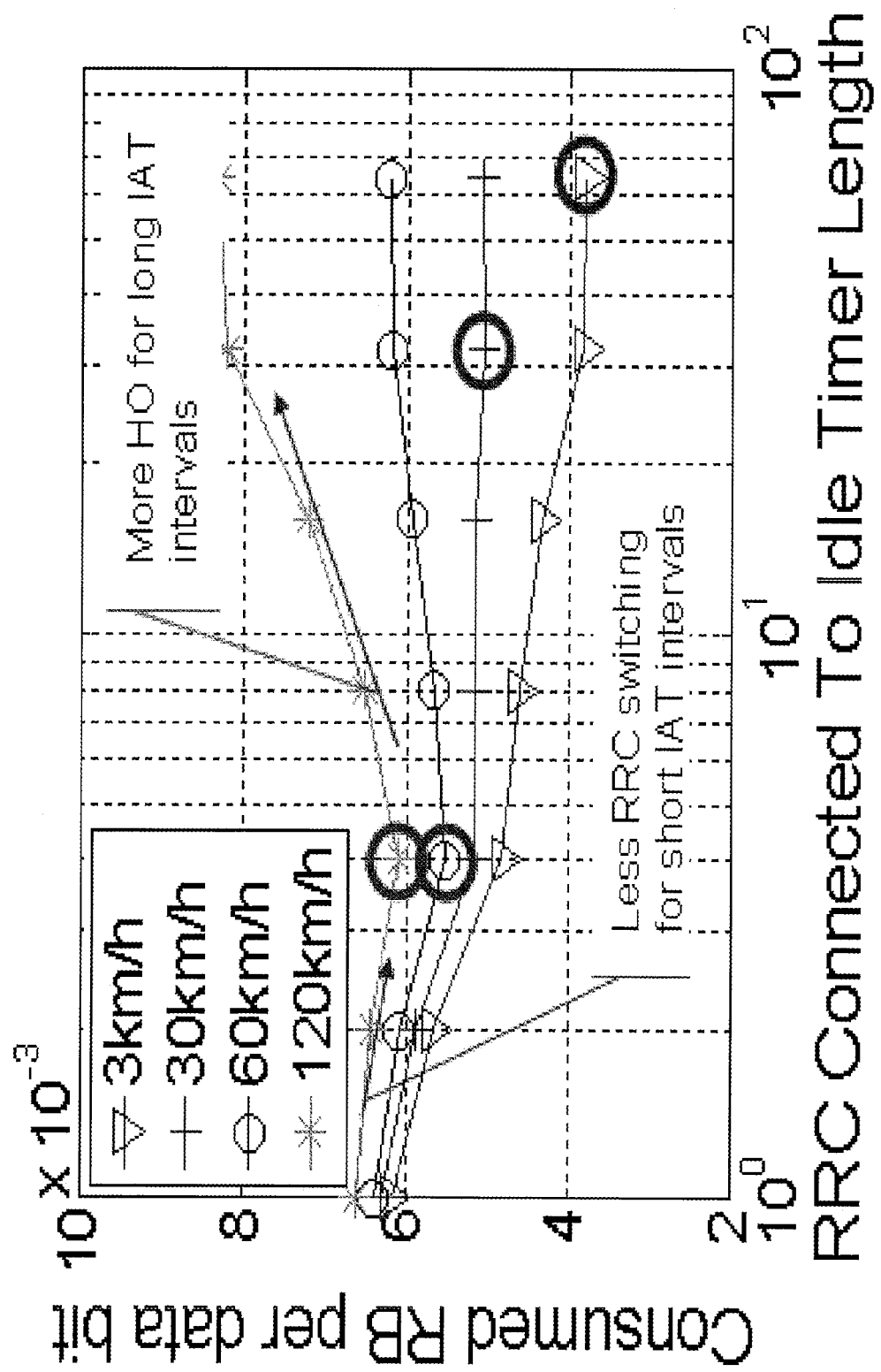
FIG. 9 is a graph illustrating the relationship between timer, mobility, and consumed RB per data bit for a particular traffic type (indicator) according to an embodiment of the current disclosure.

With reference to FIG. 8, the eNodeB provides S10 a pre-built table timer(m,i), which is the optimal RRC switching timer value for specific mobility value m and optionally a specific traffic type i, i.e., Mobility_Set(m) and Traffic_set(i) (where the always-connected strategy means an infinite long timer);

Simulations with mixed packet inter-arrival time are provided in FIG. 9. The packet distributions are based on instant messaging traffic. It can be seen that the lower the UE speed is (i.e. less frequent handovers), the longer the optimal RRC release timer is, i.e. it could be beneficial to always keep UE in connected mode. Based on the simulations, optimal timers for 3/30/60/120 km/h mobility level are 64/32/4/4 s, respectively. Consequently, with higher mobility, the RRC inactivity timer should be shorter to save resource, and for lower mobility the UE should remain in RRC_CONNECTED state to reduce signaling load.

In the previously mentioned document *RP*110454, *LTE RAN Enhancements for Diverse Data Applications, RAN*-51, Kansas City, USA, 15-18 Mar. 2011 various triggers to release the RRC connection were compared. One of the proposals was "RAN2 is requested to consider if mobility based network initiated dormancy schemes are sufficient to address the signaling concerns for smartphones".

Figure 10:
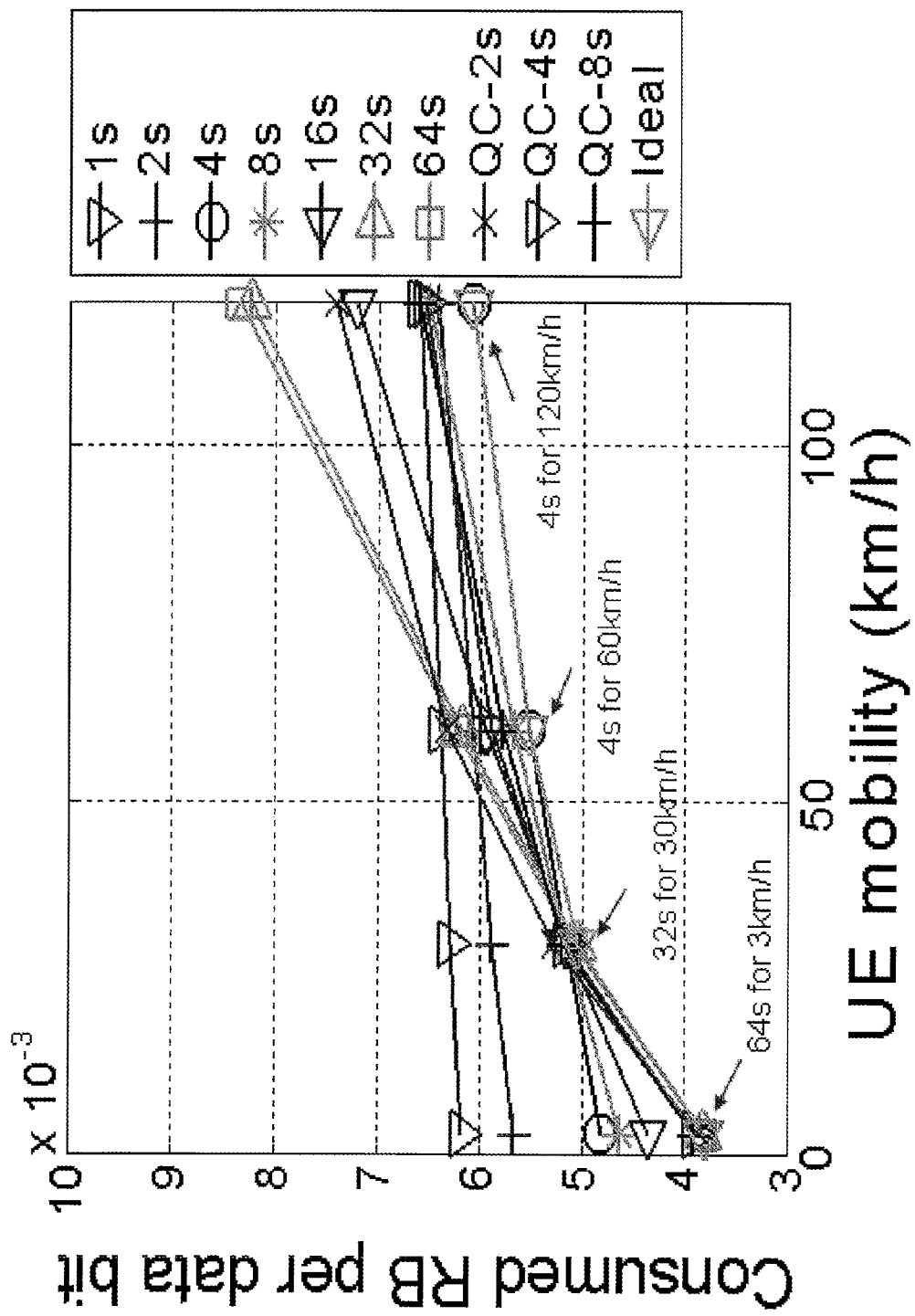
FIG. 10 is a graph illustrating a comparison between prior art and embodiments of the present disclosure.

Essentially the idea presented in *RP*110454, *LTE RAN Enhancements for Diverse Data Applications, RAN*-51, Kansas City, USA, 15-18 Mar. 2011 is to release the RRC connection of the UE, only if 1) this UE is inactive for N seconds, and 2) at least one handover operation is observed during the N seconds. FIG. 10 shows the comparison of three different triggers, namely 1) a fixed timer, 1/2/4/8/16/32/64 s; 2) the above mentioned mobility based scheme of *RP*110454, *LTE RAN Enhancements for Diverse Data Applications, RAN*-51, Kansas City, USA, 15-18 Mar. 2011, where the parameter N is 2/4/8 s; 3) a mobility-specific scheduling scheme, where the timer is set to 64 s for 3 km/h, 32 s for 30 km/h, 4 s for 60 km/h and 120 km/h; numbers based on the simulation results in section 2.1. The metric is consumed RB per data bit.

It can be observed that the performance of scheme 2) is between the fixed timer scheme and the mobility-specific scheduling scheme. For the 3 km/h case, with low mobility, scheme 2 and 3 perform equally well, but with higher mobility (~>=30 km/h), scheme 2 suffers from the inaccuracy of UE mobility estimation. This since that if the timer is too short (e.g., 2 s, 4 s), it is difficult to catch a HO operation because the observation window is too narrow; else if the timer is too long (e.g., 8 s), the observation window becomes is too wide incorporating too many HOs. Therefore, to further reduce the signaling overhead, the RRC timer needs to be set adaptively according the historical UE mobility information. Consequently, and as presented in this disclosure, RRC inactivity timer settings adapted to the level of mobility will provide improved system performance in terms of signaling load.

The aforementioned timer table timer(m,i) can be built according to a pre-simulation or test. For example, FIG. 9 shows the performance of signaling overhead (consumed RB per data bit) vs. RRC switching timer length for various UE mobility measures for instant message traffic model. The optimal timer value for each mobility measure is marked with a bold circle in the diagram. It can be observed that, the best timer should be 4 s for 60 and 120 km/h mobility, 32 s for 30 km/h and longest timer (i.e., keep the UE in connected mode) for 3 km/h. In this way, a different timer can be obtained for different UE mobility, and this can be extended to other traffic scenarios, e.g., gaming, voice, video traffic. The evaluation for different traffic is necessary because the inter-arrival-time (IAT) is different for various traffic types, and the IAT would affect the value of the optimal RRC timer.

Besides the signaling overhead another aspect to consider is delay. Generally, a longer timer means lower delay, since less time spent on RRC state switching. The requirement for delay is traffic specific, e.g., low-delay requirement for VoIP yet high delay allowed for Email. Hence, according to a further embodiment, when building the timer table, the requirement for delay should be taken into account as well as a trade-off.

The aforementioned previous method according to the document *R2-116036, Signaling considerations for background traffic, Qualcomm Incorporated, RAN2#76,* Nov. 14-18, 2011 i.e., which only copes with two mobility levels—low/high, is a relatively rough scheme, and it is difficult to tune the value of N for high mobility UEs. Specifically, if setting N to be too short, it is difficult to catch a HO operation within the N interval, but if setting N to be too long, it would be already much larger than the optimal value. Therefore, it can be found in FIG. 6 that the prior art scheme shows worse performance than the present disclosure. In FIG. 6 the signaling overhead (consumed RB per data bit) is plotted as a function of UE mobility for a plurality of RRC switching schemes, including set timer lengths according to prior art and the semi fixed timer length according to the document *R2-116036, Signaling considerations for background traffic, Qualcomm Incorporated, RAN2#76,* Nov. 14-18, 2011.

The scheme above can be further simplified, e.g., the index of traffic can be neglected, to set the timer based only on the UE mobility.

With further reference to FIG. 8, the step of detecting S20 a UE mobility M can be performed in various different ways. An embodiment of a method to detect the UE mobility M when UE is in connected mode can be based on the UE historical information passed through the so called X2 interface, as presented in the document *3GPP TS 36.423 V10.2.0, Evolved Universal Terrestrial Radio Access Network (E-UTRAN), X2 application protocol (X2AP), Section 9.2.38,* which provides the duration UE spent in each cell. When UE is in idle mode, according to a novel method can be used to acquire the UE mobility information via UE reporting. Hence, whatever UE RRC state is, the mobility index M can be obtained.

Additionally, the optional step of detecting S21 the UE traffic type (indicator) can also be performed in various different ways. An example method to detect the UE traffic I is based on the so-called DPI (Deep Packet Inspection) technology, it can be implemented at the eNodeB side, i.e., to enable a local decision. By detecting the session initiation/end for specific traffic, the eNodeB would know this traffic is started or ending and can choose a different RRC timer accordingly.

It is important to notice that if multiple traffic is on-going simultaneously, different criterion can be used to make the final decision, e.g., 1) the traffic with the shortest IAT (Inter Arrival Time) takes effect since it would cause more frequent RRC state switching; or 2) the traffic with lowest delay requirement takes effect since the delay performance is more important for UE experience.

With reference to FIG. 8, the step of selecting S30 an optimal RRC switching timer for the user equipment can be easily extended to more complicated scenario, e.g., when UE power consumption is also considered. Based on a previous evaluation the current DRX configuration range is capable to enable comparable power consumption in RRC connected and idle mode, so no big difference for different RRC timer. However, if in case that connected mode is much more power consuming than idle mode since a short DRX cycle (e.g., ~20 ms) is used (e.g., due to strict delay requirement), the RRC timer should also consider the UE power consumption as well. Then the timer table can include another index for this, e.g., a DRX configuration index. In this way, when DRX is configured to be too power consuming, the RRC timer should be slightly shorter to save power, or otherwise, the RRC timer can be longer.

One of the conclusions from the above is that it is beneficial to keep the low-mobility UEs in CONNECTED mode to reduce signaling. However, if power consumption is included as a metric will this conclusion still be valid? In the scheme with mobility-based RRC timer setting, one drawback is for low-mobility UEs; it is better to keep them in CONNECTED mode to reduce signaling, but from the results here, it is found that the CONNECTED mode is more power-consuming if the DRX cycle is set to be short (e.g., because of latency requirement).

Figure 11:
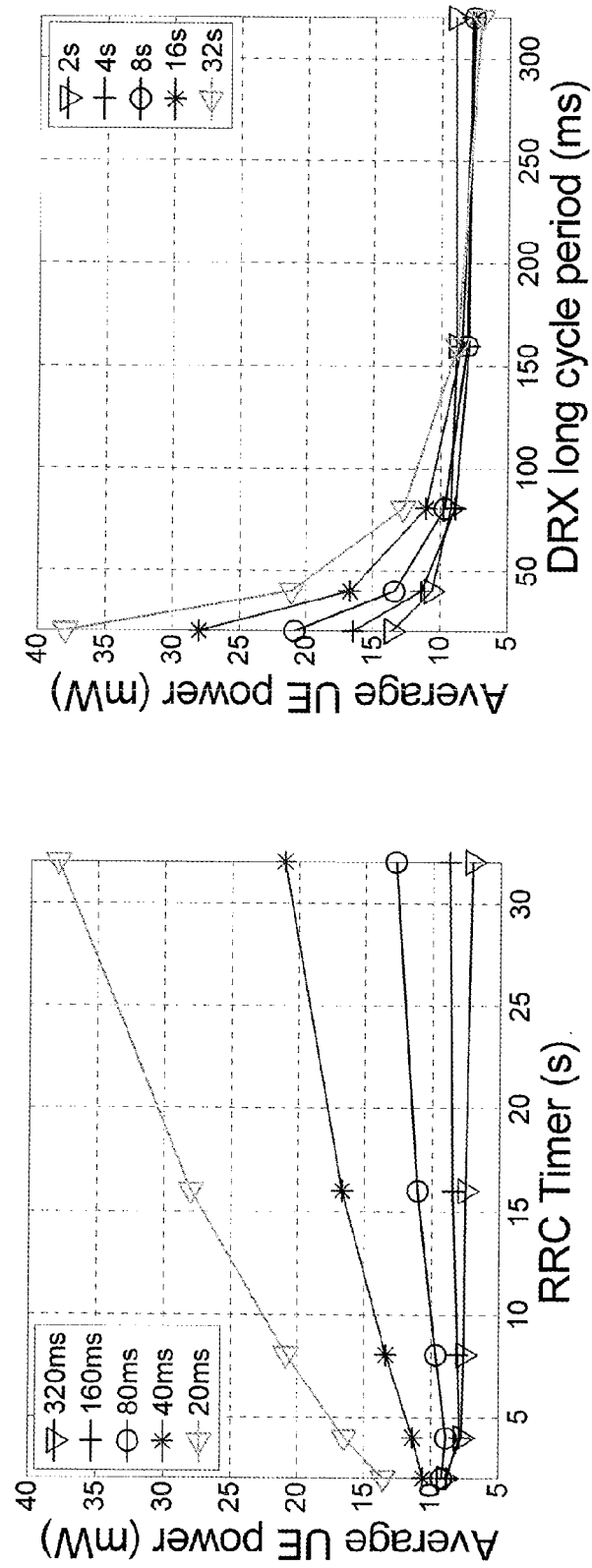
FIG. 11 illustrates comparisons of UE power consumption vs RRC timer and DRX long cycle period respectively.

The simulation results, as illustrated in FIG. 11, which show the UE power consumption performance of 3 km/h UE speed for different RRC timer and DRX settings, simply that with an appropriate DRX setting it is possible to achieve comparable power consumption in CONNECTED and IDLE mode. Hence, the assumption on RRC release timer, based on signaling load, is correct also from a power consumption perspective. Note that the results show that mobility-specific RRC release trigger works well from a power consumption perspective for traffic not particularly delay sensitive, such as background traffic and instant messaging traffic. Therefore, by selecting RRC timer settings based on mobility the signaling cost will be reduced, and consequently the power consumption will be reduced.

Figure 12:
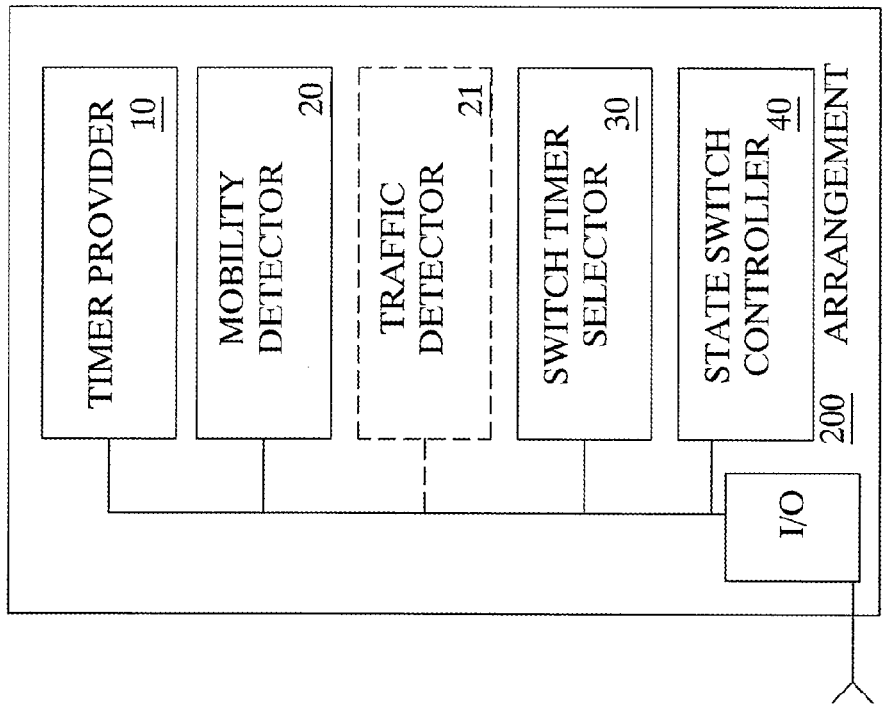
FIG. 12 is a schematic block chart of an embodiment of an arrangement according to the present disclosure.
Figure 12:
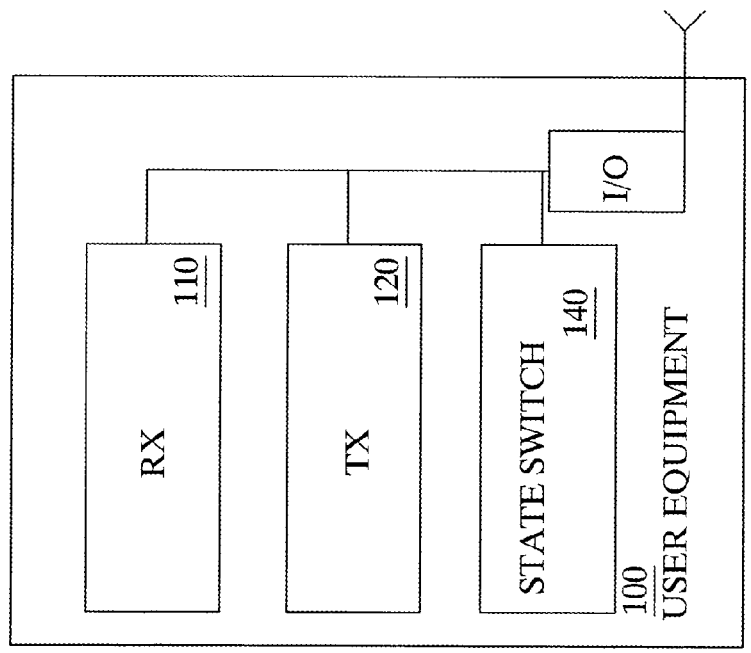

With reference to FIG. 12, a user equipment 100 and an arrangement 200 configured for controlling the RRC state switching for a user equipment in a wireless communication system according to the present disclosure will be described.

The arrangement 200 is configured for performing and providing all functionality as described with reference to the above embodiments of a method. In particular, the arrangement 200 for controlling RRC state switching for user equipment in a wireless communication system, includes a state switch controller 40 configured for controlling RRC state switching between an idle state and a connected state for a user equipment based on at least a detected mobility measure for the user equipment. The mobility measure can provide an indication of how quickly the user equipment moves in the communication system. According to a further embodiment, the arrangement 200 is optionally configured for controlling switching additionally based on a detected traffic type indicator for the user equipment.

Also with reference to FIG. 12, an embodiment of an arrangement 200 according to the present disclosure further comprises a timer provider 10 configured for providing a table comprising optimal timer values based on specific mobility and optionally traffic type combinations for user equipment. Additionally the arrangement 200 includes a mobility detector 20 configured for detecting at least a current mobility measure for a user equipment, and optionally a traffic detector 21 configured for detecting a traffic type indicator for the user equipment. Further, the arrangement 200 includes a timer selector 30 configured for selecting an optimal RRC timer for the user equipment from the table based on the detected at least current mobility value and optionally the traffic type indicator. Finally, the state switch controller 40 is further configured for controlling switching of RRC state between an idle state and a connected state for the user equipment based on the selected optimal RRC timer.

The controller arrangement 200 can be provided in an eNodeB in the wireless communication system. The steps, functions, procedures, and/or blocks described above may be implemented in hardware using any conventional technology, such as discrete circuit or integrated circuit technology, including both general-purpose electronic circuitry and application-specific circuitry.

The embodiment of a user equipment 100 includes a transceiver circuitry 110 and a receiver circuitry 120 according to known measures for enabling connecting to the eNodeBs of the wireless communication system. Further, the user equipment 100 includes an RRC switching unit 140 that is configured for switching the user equipment 100 between an idle state e.g. RRC_IDLE and a connected state e.g. RRC-CONNECTED. The switching unit 140 is further configured for adaptively switching the RRC state of the UE in response to receiving control signaling including an adaptively selected RRC state switching timer provided by e.g. the eNodeB 200 or other node in the system.

Alternatively, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

The computer program product for controlling RRC (Radio Resource Control) state switching in a wireless communication system, according to the present disclosure, may be configured to adaptively controlling (S40) RRC state switching between an idle state and a connected state for a user equipment based on at least a detected mobility measure for said user equipment when the computer program product is run on a computer 300. Further, according to another embodiment, the computer program product may be further configured to provided (S10) a timer table comprising predetermined RRC timer values based on at least specific mobility measures for user equipment, and detect (S20) at least a current mobility measure for a user equipment. In addition, the computer program product may be configured to select (S30) an optimal RRC timer for said user equipment from said provided timer table based on said detected at least current mobility measure; and said controlling step (S40) comprises adaptively controlling (S40) RRC state switching for said user equipment based on said selected optimal RRC timer.

Figure 13:
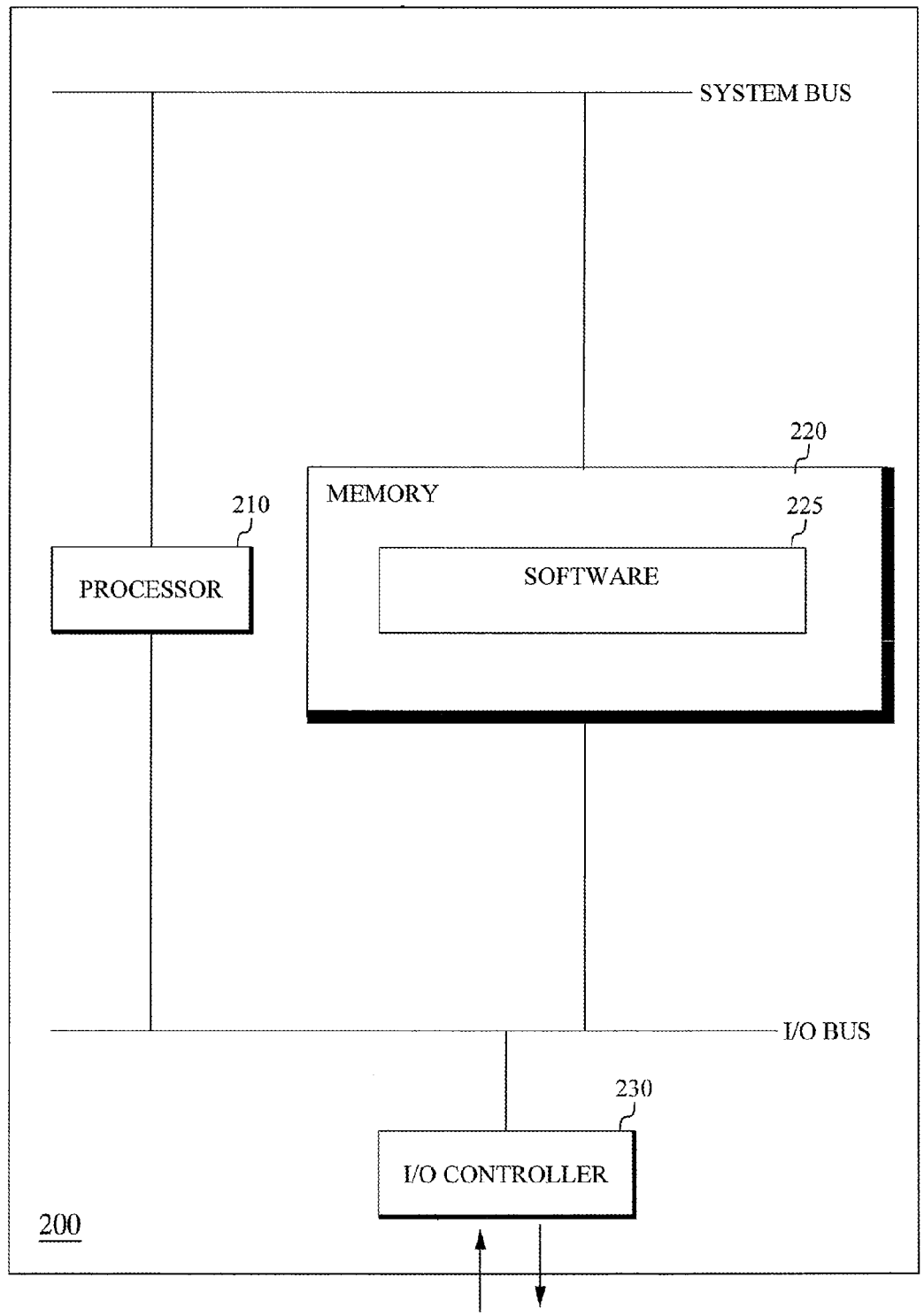
FIG. 13 is a schematic block chart of a computer implementation of the present disclosure.

In the following, an example of a computer-implementation will be described with reference to FIG. 13. A computer 300 comprises a processor 310, an operating memory 320, and an input/output unit 330. In this particular example, at least some of the steps, functions, procedures, and/or blocks described above are implemented in software 325, which is loaded into the operating memory 320 for execution by the processor 310. The processor 310 and memory 320 are interconnected to each other via a system bus to enable normal software execution. The I/O unit 330 may be interconnected to the processor 310 and/or the memory 320 via an I/O bus to enable input and/or output of relevant data such as input parameter(s) and/or resulting output parameter(s).

Advantages of the present disclosure includes controlling the UE RRC state switching based on mobility and traffic for a specific user equipment to effectively and jointly minimize signaling overhead, delay and UE power consumption.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX

| APPENDIX | |
|---|---|
| Simulations settings | |
| Traffic Model | |
| Traffic Model | MBM Instant Message traffic on Android platform |
| Network Model | |
| Cell Layout | 7 sites hexagonal grid: 3-sector sites |
| Inter-Site Distance | Macro scenario 1: 500 m |
| Carrier Frequency | 2 GHz |
| Distance dependent path loss | L = 128.1 + 37.6log10(R) dB R is distance in kilometers, an extra 20 dB penetration loss is added |
| Channel Model | Typical Urban |
| Shadow Fading | Log-normal, 8 dB standard deviation, 0.5 correlation between eNodeBs |
| System Model | |
| Bandwidth | 5 MHz |
| PRACH | 64 preambles, 10 Dedicated preambles, 0 dB PRACH Tx Power ramp-up step ra-ResponseWindowSize - 5 ms, mac-ContentionResolutionTimer - 32 ms, PRACH Period - 10 ms |
| PUCCH | 10 ms SR/CQI period |
| HARQ | Maximum retransmission number = 9 |
| Scheduler | Proportional Fairness |
| RRC | CONNECTED to IDLE timer = 1 s, 2 s, 4 s, 8 s, 16 s, 32 s, 64 s. |
| RLC | Maximum retransmission number - 4 |
| DRX | onDuration timer = 2 ms, inActivity timer = 2 ms, Short cycle = 20 ms, Long cycle = 40/80/160/320 ms, Short cycle timer = 20/40/80/100/160 ms. |

APPENDIX-continued

| Simulations settings | |
|---|---|
| Handover | A3 Event simulated, Offset = 4 dB, Time to trigger = 40 ms |
| Synchronization | Time alignment timer = 1 s |
| Receiver Noise Factor | 5 dB |
| Antenna model | 2D 3GPP SCM antenna, 2 Tx and 2 Rx antennas |

User Model

| | |
|---|---|
| Receiver Noise Factor | 9 dB |
| UE mobility | Straight mobility model, with 3/30/60/120 km/h velocity |
| Antenna Model | Omni antenna, 1 Tx and 2 Rx antennas |

The invention claimed is:

1. A method of controlling Radio Resource Control (RRC) state switching in a wireless communication system, the method comprising:
adaptively controlling RRC state switching between an idle state and a connected state for a user equipment based on at least a detected mobility measure for said user equipment;
wherein said adaptively controlling RRC state switching is based on an RRC state switching timer that is selected based on at least said detected mobility measure.

2. The method of claim 1, further comprising:
providing a timer table comprising predetermined RRC timer values based on at least specific mobility measures for user equipment;
detecting at least a current mobility measure for a user equipment; and
selecting an optimal RRC timer for said user equipment from said provided timer table based on said detected at least current mobility measure;
wherein said adaptively controlling comprises adaptively controlling RRC state switching for said user equipment based on said selected optimal RRC timer.

3. The method of claim 1, wherein said idle state corresponds to an RRC_IDLE state and said connected state corresponds to a RRC_CONNECTED state for said user equipment.

4. The method of claim 1, wherein said adaptively controlling RRC state switching for said user equipment is based further on a detected traffic type indicator for said user equipment.

5. The method of claim 4, further comprising:
providing a timer table comprising predetermined RRC timer values based on specific mobility and traffic type combinations,
detecting at least a current mobility measure for a user equipment;
detecting a current traffic type indicator for said user equipment; and
selecting an optimal RRC timer for said user equipment from said provided timer table based on said detected at least current mobility measure and detected current traffic type indicator;
wherein said adaptively controlling RRC state switching for said user equipment is based on said selected optimal RRC timer.

6. The method of claim 2, wherein the optimal RRC timer is selected to minimize at least one of signaling overhead, delay, and power consumption for said user equipment.

7. The method of claim 6, wherein the optimal RRC timer is selected to jointly minimize signaling overhead, delay, and power consumption for said user equipment.

8. The method of claim 5, wherein selecting said optimal RRC timer is further based on a DRX index.

9. The method of claim 1, wherein said adaptively controlling comprises signaling said selected RRC state switching timer to said user equipment.

10. The method of claim 1, wherein said adaptively controlling comprises ordering said user equipment to switch RRC state based on said selected RRC timer.

11. An apparatus for controlling Radio Resource Control (RRC) state switching for user equipment in a wireless communication system, said apparatus comprising:
a switch controller configured to control RRC state switching between an idle state and a connected state for a user equipment based on at least a detected mobility measure for said user equipment;
wherein said switch controller is configured to adaptively control RRC state switching based on an RRC state switching timer that is selected based on at least said detected mobility measure.

12. The apparatus of claim 11, further comprising:
a timer provider configured to provide a table comprising optimal timer values based on specific mobility measures for user equipment,
a mobility detector configured to detect at least a current mobility measure for a user equipment; and
a timer selector configured to select an optimal RRC timer for said user equipment from said table based on said detected at least current mobility measure;
wherein said switch controller is further configured to control switching of RRC state for said user equipment based on said selected optimal RRC timer.

13. The apparatus of claim 11, wherein said switch controller is further configured to control switching additionally based on a detected traffic type indicator for said user equipment.

14. The apparatus of claim 13, further comprising:
a timer provider configured to provide a table comprising optimal timer values based on specific mobility and traffic type combinations for user equipment,
a mobility detector configured to detect at least a current mobility measure for a user equipment;
a traffic detector configured to detect a traffic type indicator for said user equipment; and
a timer selector configured to select an optimal RRC timer for said user equipment from said table based on said detected at least current mobility measure and traffic type indicator;
wherein said switch controller is configured to control switching of RRC state for said user equipment based on said selected optimal RRC timer.

15. The apparatus of claim 12, wherein said timer selector is configured to select said RRC timer to minimize at least one of signaling overhead, delay, and power consumption for said user equipment.

16. The apparatus of claim 15, wherein said timer selector is configured to select said optimal RRC timer to jointly minimize signaling overhead, delay, and power consumption for said user equipment.

17. A node in a wireless communication system, said node comprising the apparatus of claim 11.

18. The node of claim 17, wherein said node is an eNodeB in a LTE wireless communication system.

19. A non-transitory computer-readable medium comprising a computer program stored thereupon for controlling Radio Resource Control (RRC) state switching in a wireless communication system when said computer program is executed by a computer, said computer program comprising program instructions for:

adaptively controlling RRC state switching between an idle state and a connected state for a user equipment based on at least a detected mobility measure for said user equipment;

wherein said adaptively controlling RRC state switching is based on an RRC state switching timer that is selected based on at least said detected mobility measure.

20. The non-transitory computer-readable medium of claim 19, the computer program further comprising program instructions for:

providing a timer table comprising predetermined RRC timer values based on at least specific mobility measures for user equipment;

detecting at least a current mobility measure for a user equipment; and selecting an optimal RRC timer for said user equipment from said provided timer table based on said detected at least current mobility measure;

wherein said adaptively controlling RRC state switching for said user equipment is based on said selected optimal RRC timer.

* * * * *

UNITED STATES PATENT AND TRADEMARK OFFICE
CERTIFICATE OF CORRECTION

PATENT NO.         : 8,792,423 B2                                   Page 1 of 1
APPLICATION NO.    : 13/521314
DATED              : July 29, 2014
INVENTOR(S)        : Lu et al.

It is certified that error appears in the above-identified patent and that said Letters Patent is hereby corrected as shown below:

On the Title Page, below Item (65), insert Item -- (30) Foreign Application Priority Data
Jan 30, 2012 (CN) PCT/CN2012/070748 --.

On the Title Page, in the Figure, for Tag "S30", in Line 1, delete "RCC" and insert -- RRC --, therefor.

In the Drawings:

In Fig. 8, Sheet 8 of 13, for Tag "S30", in Line 1, delete "RCC" and insert -- RRC --, therefor.

In Fig. 12, Sheet 12 of 13, in Box "110", in Line 1, delete "RX" and insert -- TX --, therefor.

In Fig. 12, Sheet 12 of 13, in Box "120", in Line 1, delete "TX" and insert -- RX --, therefor.

In the Specification:

In Column 8, Line 1, delete "RCC" and insert -- RRC --, therefor.

Signed and Sealed this
Nineteenth Day of May, 2015

Michelle K. Lee
*Director of the United States Patent and Trademark Office*